July 20, 1943.                LaVERNE E. CLIFCORN                2,324,765
                            SURPLUS FILL DRAW-OFF MEANS
                    Filed Dec. 31, 1941              3 Sheets-Sheet 2

Inventor
La Verne E. Clifcorn
By Mason & Porter
Attorneys

Patented July 20, 1943

2,324,765

UNITED STATES PATENT OFFICE 2,324,765

SURPLUS FILL DRAWOFF MEANS

La Verne Edward Clifcorn, Chicago, Ill., assignor to Continental Can Company, Inc., New York, N. Y., a corporation of New York Application December 31, 1941, Serial No. 425,219

14 Claims. (Cl. 226—22)

The invention relates generally to apparatus for ascertaining that liquid filled containers intended for the market shall include a predetermined quantity of fill. While adapted for more general uses, the invention primarily seeks to provide a novel form of surplus fill draw-off means particularly adaptable to use in machines of the character shown and described in the co-pending application for U. S. Letters Patent Serial No. 423,697, filed by Alfred L. Kronquest on December 19, 1941, and in which is included means for rapidly and efficiently testing the level of the fill in liquid filled containers, means for drawing off and reclaiming fill surpluses, and means for automatically rejecting all slack filled containers.

In the particular form of machine hereinbefore referred to, filled containers are fed into the machine in properly spaced relation and are received on individual supporting pads forming part of a peripherally pocketed rotary turret structure. The turret structure is rotatable about a central column in which is mounted a suction tube for drawing off and reclaiming fill surpluses from containers tested on the turret. The turret structure includes a testing head overlying each container supporting pad and each testing head includes a surplus draw-off tube structure which forms the main subject matter of the present invention, and electrodes engageable with the liquid in containers which are filled up to or in excess of the predetermined fill level for the purpose of controlling devices which operate to assure that slack filled containers are separated from the properly filled containers as they are fed from the machine. Means also is provided for lifting each pad at the testing station so that the surplus fill draw-off tube and the electrodes are suspended at a predetermined level in the container being tested. During this testing, any surplus fill in the container will be drawn off and reclaimed, and if the electrodes fail to contact the liquid, thereby indicating a slack fill, control devices are actuated to effect a rejection of the slack filled container. The present invention relates particularly to certain new and useful improvements in the surplus fill draw-off means.

It has been discovered that when an ordinary tubular structure is immersed in a liquid and evacuated to cause a drawing of liquid upwardly into the tube, surface tension in the liquid tends to cause the top surface of the liquid to draw up as a cone for an interval after the level of the liquid in the container has been lowered to the level to which the lower extremity of the tube is immersed, and this cone will continue to draw upwardly until the surface tension is broken. Obviously the liquid level in containers in which surplus fill is thus drawn off will be erratically lower than is intended, and it is the purpose of the present invention to provide a surplus fill draw-off means which will avoid the objections noted.

In its more specific nature the invention resides in providing a surplus fill draw-off tube adapted to be suspended in a container for drawing off surplus fill therefrom and equipped at its lower end with a cup into which the contained liquid flows over an upper feathered edge which is disposed at the proper fill level, thereby making it possible to draw off surplus liquid directly from said cup and avoiding the drawing up of a cone of liquid by the draw-off tube as a result of surface tension in the liquid.

Another object of the invention is to provide a tube and cup structure of the nature stated in which the cup is of considerably larger diameter than the tube so as to provide a substantial liquid receiving space surrounding the lower extremity of the tube, said cup having web structures therein providing a threadable mount for removable attachment to the lower end extremity of the draw-off tube.

With the above and other objects in view that will hereinafter appear, the nature of the invention will be more fully understood by following the detailed description, the appended claims, and the several views illustrated in the accompanying drawings.

In the example of embodiment of the invention herein illustrated, the improved surplus fill draw-off means is shown as incorporated in a fill checking and surplus reclaiming machine of the character disclosed in the copending application for U. S. Letters Patent, Serial No. 423,697, filed by Alfred L. Kronquest on December 19, 1941. It is to be understood, of course, that while the invention is particularly adaptable to use in machines of this type, it may be incorporated in other forms of fill checking and reclaiming machines, or in filling machines.

Figure 1:
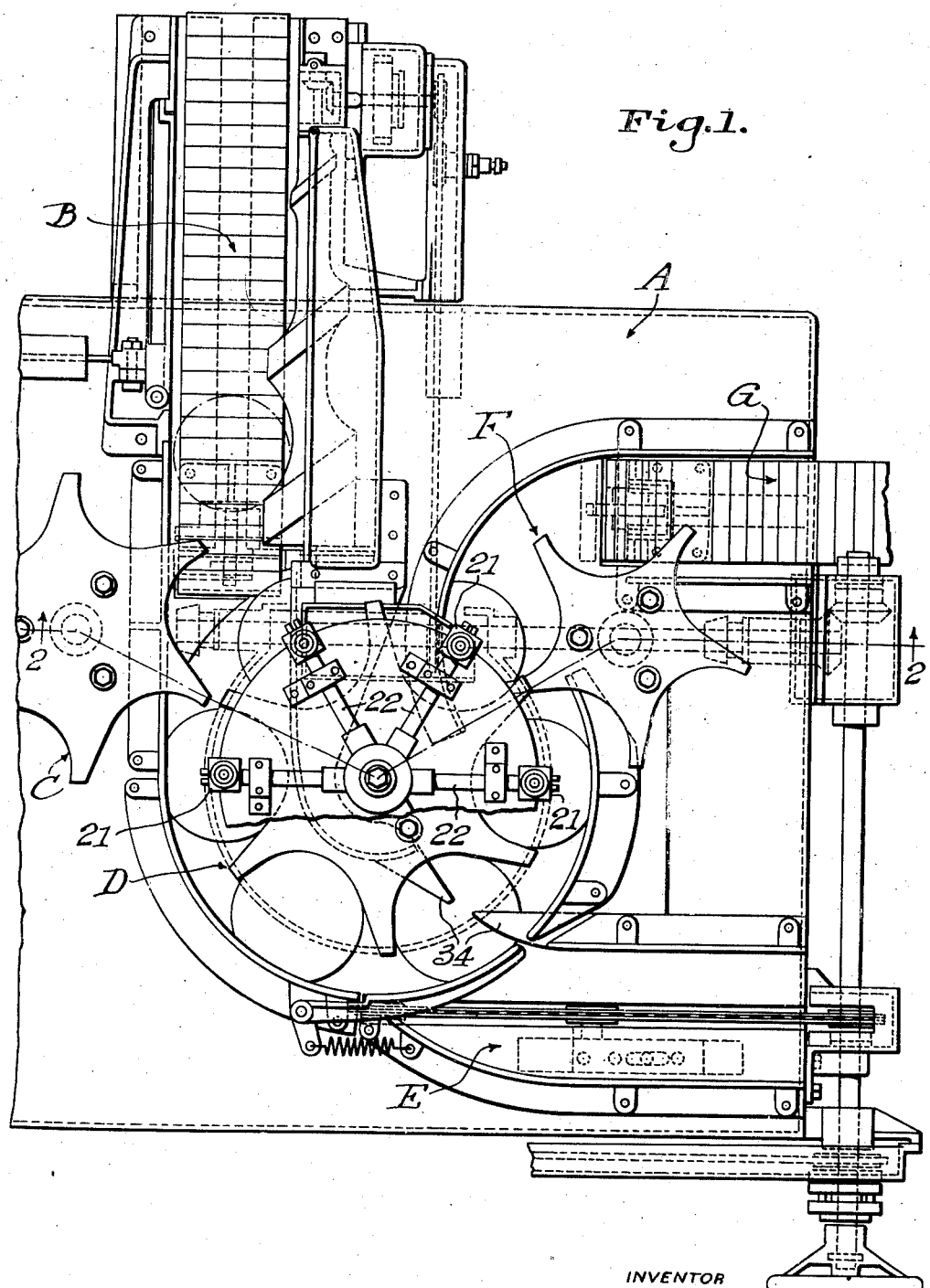
Figure 1 is a plan view of a fill checking and surplus reclaiming machine embodying the invention.
Figure 2:
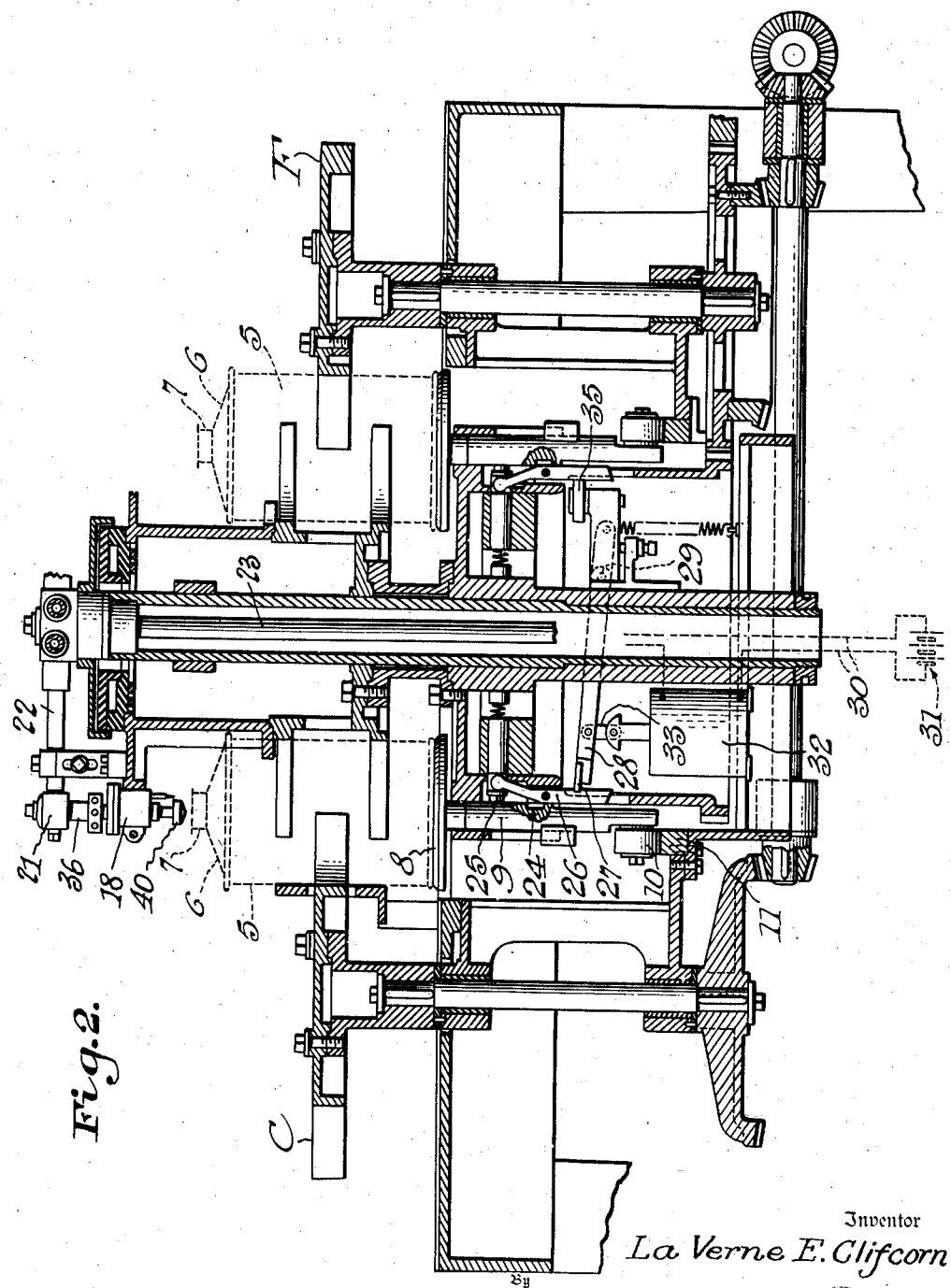
Figure 2 is a vertical cross section taken on the line 2—2 on Figure 1.

In the particular machine referred to and herein illustrated in partial detail, there is included a frame having a top or table portion A over which filled containers are fed into the machine by feed-in mechanism generally designated B, and transferred by a star-wheel or transfer turret C to the main turret D wherein the containers are tested to determine whether they are overfilled or underfilled and on which any contained liquid surpluses are drawn off. Slack filled containers are discharged from a rejection pass E, while properly filled containers pass on and are transferred by the star-wheel or transfer turret F onto the delivery-way or feed-off mechanism generally designated G. See Figure 1.

While it is to be understood also that the invention is adaptable for use in testing and drawing off fill surpluses from various forms of containers, the containers herein illustrated are of the gallon can type such as are employed in the packaging of syrup, beverages, or the like. These containers include a body portion 5 to the upper end of which is affixed a cone top 6 terminating in a restricted pouring throat 7. The testing of the liquid level in said containers and the drawing off of liquid surpluses therefrom is effected through the restricted throat 7.

Since the particular form of fill checking and surplus reclaiming machine herein illustrated is disclosed in detail in the Kronquest application hereinbefore referred to, the detail structure of this machine and its operation will be referred to only briefly herein. As each filled container 5 is transferred by the star-wheel C onto the turret structure D, it is received on a supporting pad 8 carried at the upper end of a plunger 9 which is vertically reciprocable in a bearing provided therefor in the turret and equipped at its lower end with a roller 10 engageable with a cam track 11 for determining the position of the pad 8. It will be observed by reference to Figure 1 that the turret is equipped with a plurality of pockets and testing equipments, and that there is a pad 8 disposed centrally beneath each testing equipment and centered under each pocket.

Figure 4:
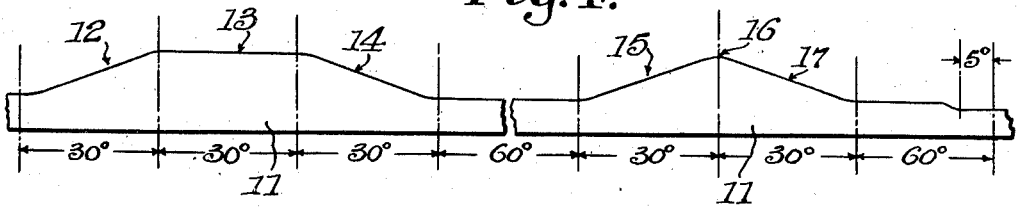
Figure 4 is a diagrammatic development of the supporting pad position controlling cam.

It will be observed by reference to Figure 4 of the drawings that the cam track 11 includes a lift portion 12, a horizontal dwell portion 13 which is placed at the position at which the testing of each filled container and the drawing off of any surplus fill takes place and which merges into a pad lowering portion 14. Another pad lifting portion 15 is provided on the cam and leads to a crest 16 disposed at the same level of and at a point spaced circumferentially approximately 120° from the terminus of the dwell portion 13, which said crest merges into another pad lowering portion 17.

Each testing unit includes a support plug 18 in which the electrodes 19 and the surplus fill draw-off tube generally designated 20 are mounted, and it will be observed that each tube 20 connects through a T-head 21 and an individual, radially disposed duct 22 with a common suction duct 23 extending centrally downwardly through the turret structure and being connected, in a manner not shown herein, with a suitable suction source and also with a reservoir into which reclaimed surplus fill liquid can be deposited.

Each pad stem 9 has a latch recess 24 therein for receiving a spring-projected latch 25 carried by the turret. A pivoted latch actuator 26 is associated with each latch, and within the turret structure is mounted a latch tripping cam 27 carried on a lever 28 which is swingable in a vertical plane about a fixed pivot 29. The electrodes 19 are electrically connected, as at 30, with a source of electrical energy diagrammatically illustrated at 31 and with a solenoid 32 the core of which is link-connected, as at 33, with the lever 28. The lever-carried cam 27 is normally disposed in a position for being engaged by each latch actuator 26 at the fill checking station to hold the latch 25 away from the respective pad stem 9, but whenever a circuit is completed through the electrodes 19 by engagement thereof with liquid in a container being tested, the solenoid will be energized and the lever 28 lowered so as to displace the cam 27 and free the respective latch 25 so that it will enter the stem recess 24 and hold the pad elevated.

Figure 3:
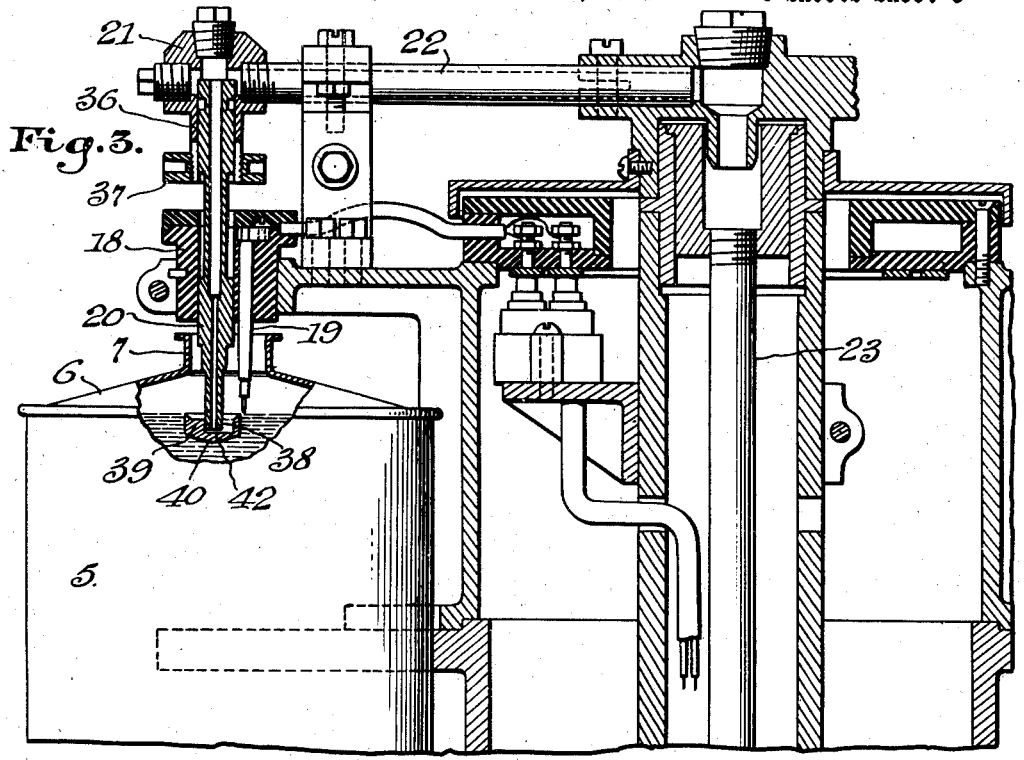
Figure 3 is an enlarged fragmentary sectional view illustrating the surplus draw-off tube equipment immersed in a filled container.

As each roller 10 rides up the lift portion 12 of the cam the container supported on the associated pad 8 will be lifted into the fill testing position illustrated in Figure 3 of the drawings so as to dispose the lower extremities of the electrodes 19 and the effective suction inlet into the draw-off tube structure at the normal fill level as shown. If the container includes a normal or surplus fill the engagement of the electrodes 19 with the liquid will complete a solenoid energizing circuit and free the respective latch 25 in the manner above described. All latches thus freed will retain the respective pads 8 in the elevated position while they are traveling from the dwell crest 13 of the cam at the fill checking station around to the cam crest 16. While passing in this elevated position between the cam crests 13 and 16, the pads pass over stripper cams 34 which would otherwise be effective to divert containers into the rejection pass E. See Figure 1. Containers thus determined to be slack filled are delivered into the normal feed-off means G. At the position of the cam crest 16 there is provided a cam roller 35 which engages the latch actuators and displaces the stem holding latches 25 so that the pads supporting properly filled containers will be lowered by the lowering surface 17 of the cam and delivered to said feed-off means G. It is to be understood, of course, that while the pad rollers are traveling over the cam crest dwell portion 13, any surplus fill in the containers will be drawn off through the surplus fill draw-off means which comprises the main basis of the present invention.

It is to be understood that the machine parts briefly described hereinabove, are the parts described more fully and in greater detail in the co-pending Kronquest application above referred to. The particular form of the surplus fill draw-off means forming the main basis of the present invention will now be described.

Figure 5:
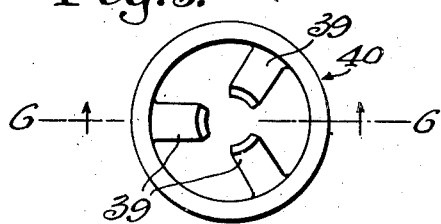
Figure 5 is a detail plan view of one of the surplus draw-off cups removed from the tube on which it is supported.
Figure 6:
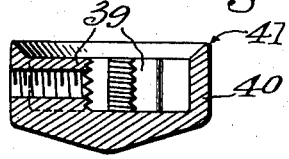
Figure 6 is a detail vertical cross section taken on the line 6—6 on Figure 5.

Each of the T-heads 21 affixed to the ends of the individual, radially projected suction ducts 22 includes a downwardly extended split clamp leg 36 which receives the surplus fill draw-off or suction tube 20. The respective tube is vertically-adjustably clamped in the mounting leg 36 through the medium of a clamping collar 37 threaded on the tapered and externally threaded lower end of said leg. Each tube 20 extends downwardly through a bore in the respective support plug 18 and is externally threaded, as at 38, at its lower extremity. The externally threaded lower extremity of each tube is removably threaded in the spider web hub 39 of a cup 40, and it will be observed by reference to Figures 3, 5 and 6 of the drawings that each cup terminates upwardly in a sharpened or feathered edge 41. It will also be observed that the cup is much larger in diameter than the lower extremity of the tube so as to provide a space of considerable size surrounding the tube within the cup and in which to receive liquid fill, and the lower extremity of the tube 20 terminates short of the bottom of the cup, as at 42, so as to provide an opening through which liquid can be drawn from said surrounding space upwardly through the hollow tube 20. See Figure 3.

The size of the opening or clearance 42 can be altered by adjusting the position of the cup 40 in its threadable mounting, thus to vary the rate of removal of the liquid from the cup.

As has been previously described, during the fill checking interval when the container supporting pad is held elevated by the cam crest dwell 13, the surplus fill draw-off tube and cup 20, 40 and the container 5 will bear the relation illustrated in Figure 3 with the feathered edge 41 of the cup disposed at the normal fill level L.

It will be obvious that if a given container is filled above the normal level L, the surplus of liquid will flow over the feathered edge 41 of the cup 40 and into the interior of the cup from whence it will be drawn off by suction through the tube 20 and the ducts 22 and 23 to be recovered in the surplus reclaiming reservoir as hereinbefore referred to.

By reason of the provision of the particular form of cup 40 which ultimately confines the volume of liquid finally being drawn off to effect a normal fill in previously overfilled containers, the sharpened or feathered edge 41 of the cup serves to break the surface tension in the liquid and make it impossible to draw up a cone of liquid and thereby withdraw from the container more than the amount necessary to reduce the overfill to a normal fill. Also, by thus eliminating the possibility of drawing up a cone of liquid during the drawing off of a surplus from filled cans in a fill checking machine, the electrodes can be placed in the manner herein disclosed without danger of having their control functions improperly performed because of the drawing up of a cone of liquid in the container being tested.

It is to be understood that the details of structure and arrangement of parts may be variously changed and modified without departing from the spirit and scope of the invention.

I claim:

1. In a machine for assuring against overfills in liquid containers, a surplus draw-off unit receivable in a filled container and including a suction tube and a cup carried at the lower end of the tube and adapted to be immersed in the liquid fill in containers to an extent placing its upper extremity at the level of normal fill whereby surplus liquid in the containers will flow into the cup and be drawn therefrom by said tube, said cup terminating upwardly in a feathered edge and having spider webbing therein in which the lower end of the tube is secured in spaced relation to the bottom of the cup.

2. In apparatus for drawing off surplus fill from filled containers, a suction tube equipment comprising a hollow tube and a cup surrounding and having its interior in communication with the lower extremity of said tube and placeable in liquid fill in a container so that the upper extremity of the cup will act to determine the level in a container when surplus fill in said container is drawn off by suction through said tube, said cup having a spider hub into which the tube is removably threaded, and said tube lower extremity terminating short of the bottom of the cup so as to provide an inlet space through which liquid can pass from the interior of the cup into the lower end of said tube.

3. In a machine of the character described, container supporting means, a surplus fill draw off means including a support and a suction tube depending from said support, a cup carried by and communicating interiorly with the lower end of said tube, and means for bringing about relative movement between said support and said supporting means to cause the tube to depend in a container on the supporting means with the upper extremity of the cup disposed at the level of normal fill in the container and any surplus fill in said container to be drawn off through the cup and tube, said cup terminating upwardly in a feathered edge effective to break surface tension in the surplus liquid being drawn off by suction through the cup and tube, and said cup having a spider hub into which the tube is removably threaded, and said tube lower extremity terminating short of the bottom of the cup so as to provide an inlet space through which liquid can pass from the interior of the cup into the lower end of said tube.

4. In a machine for assuring against overfills in liquid containers, a surplus draw-off unit receivable in a filled container and including a suction tube and a cup carried at the lower end of the tube and adapted to be immersed in the liquid fill in containers to an extent placing its upper extremity at the level of normal fill whereby surplus liquid in the containers will flow into the cup and be drawn therefrom by said tube, said cup having a spider hub into which the tube is removably threaded, and said tube lower extremity terminating short of the bottom of the cup so as to provide an inlet space through which liquid can pass from the interior of the cup into the lower end of said tube.

5. In a machine for assuring against overfills in liquid containers, a surplus draw-off unit receivable in a filled container and including a suction tube and a cup carried at the lower end of the tube and adapted to be immersed in the liquid fill in containers to an extent placing its upper extremity at the level of normal fill whereby surplus liquid in the containers will flow into the cup and be drawn therefrom by said tube, said cup terminating upwardly in a feathered edge and having spider webbing therein in which the lower end of the tube is secured in spaced relation to the bottom of the cup, and said cup having a spider hub into which the tube is removably threaded, and said tube lower extremity terminating short of the bottom of the cup so as to provide an inlet space through which liquid can pass from the interior of the cup into the lower end of said tube.

6. In apparatus for drawing off surplus fill from filled containers, a liquid draw-off means including a tubular extremity terminating in a surface tension breaking feathered edge disposable at the intended fill level in a container, and suction duct means through which surplus fill can be drawn off through said tubular extremity.

7. In apparatus for drawing off surplus fill from filled containers, a liquid draw-off means including a tubular extremity terminating in a surface tension breaking feathered edge disposable at the intended fill level in a container, suction duct means through which surplus fill can be drawn off through said tubular extremity, and means for vertically-adjustably supporting said tubular extremity.

8. In apparatus for drawing off surplus fill from filled containers, a suction tube equipment comprising an uprightly disposed hollow tube and a solid bottomed cup surrounding the lower extremity of the tube, said lower tube extremity having its interior in communication with the interior of the cup above the closure provided by the solid bottom thereof thereby to adapt the tube to receive in its lower end liquid from said cup whereby when said cup is immersed in liquid fill in a container the upper extremity of the cup will act to determine the level in a container when surplus fill in said container is drawn off by suction through said tube.

9. In apparatus for drawing off surplus fill from filled containers, a suction tube equipment comprising an uprightly disposed hollow tube and a solid bottomed cup surrounding the lower extremity of the tube, said lower tube extremity having its interior in communication with the interior of the cup above the closure provided by the solid bottom thereof thereby to adapt the tube to receive in its lower end liquid from said cup whereby when said cup is imersed in liquid fill in a container the upper extremity of the cup will act to determine the level in a container when surplus fill in said container is drawn off by suction through said tube, said upper cup extremity terminating in a feathered edge effective to break surface tension in the liquid being drawn off by suction through said tube.

10. In a machine of the character described, container supporting means, a surplus fill draw off means including a support and a suction tube depending from said support, a solid bottomed cup carried by and surrounding the lower extremity of said tube, said lower tube extremity having its interior in communication with the interior of the cup above the closure provided by the solid bottom thereof thereby to adapt the tube to receive in its lower end liquid from said cup, and means for bringing about relative movement between said support and said supporting means to cause the tube to depend in a container on the supporting means with the upper extremity of the cup disposed at the level of normal fill in the container whereby any surplus fill in said container will be drawn off through the cup and tube.

11. In a machine of the character described, container supporting means, a surplus fill draw off means including a support and a suction tube depending from said support, a solid bottomed cup carried by and surrounding the lower extremity of said tube, said lower tube extremity having its interior in communication with the interior of the cup above the closure provided by the solid bottom thereof thereby to adapt the tube to receive in its lower end liquid from said cup, and means for bringing about relative movement between said support and said supporting means to cause the tube to depend in a container on the supporting means with the upper extremity of the cup disposed at the level of normal fill in the container whereby any surplus fill in said container will be drawn off through the cup and tube, said cup terminating upwardly in a feathered edge effective to break surface tension in the surplus liquid being drawn off by suction through the cup and tube.

12. In a machine for assuring against overfills in liquid containers, a surplus draw-off unit receivable in a filled container and including a suction tube and a solid bottomed cup carried by and surrounding the lower extremity of the tube, said lower tube extremity having its interior in communication with the interior of the cup above the closure provided by the solid bottom thereof thereby to adapt the tube to receive in its lower end liquid from said cup whereby when said cup is immersed in the liquid fill in containers to an extent placing its upper extremity at the level of normal fill surplus liquid in the containers will flow into the cup and be drawn therefrom through said tube.

13. In a machine of the character described, container supporting means, a tester unit including a support and suction tube structure and electrode means depending from said support, means for bringing about relative movement between said support and said supporting means to cause said tube structure and electrode means to depend in a container on the supporting means with the electrode means extending down to a predetermined normal liquid fill level in said container thereby to cause said electrode means to contact the liquid and said suction tube to be immersed in the liquid, and container handling means controlled by said electrode means, said suction tube structure including a solid bottomed cup at its lower end, the upper edge of said cup being disposed at the normal fill level when the tube structure depends in a container and said tube having provision at its lower extremity for communicating with the interior of the cup above the closure formed by the solid bottom thereof whereby surplus fill flowing into the cup from within the container will be drawn off through the tube.

14. In a machine of the character described, container supporting means, a tester unit including a support and suction tube structure and electrode means depending from said support, means for bringing about relative movement between said support and said supporting means to cause said tube structure and electrode means to depend in a container on the supporting means with the electrode means extending down to a predetermined normal liquid fill level in said container thereby to cause said electrode means to contact the liquid and said suction tube to be immersed in the liquid, and container handling means controlled by said electrode means, said suction tube structure including a solid bottomed cup at its lower end, the upper edge of said cup being disposed at the normal fill level when the tube structure depends in a container and said tube having provision at its lower extremity for communicating with the interior of the cup above the closure formed by the solid bottom thereof whereby surplus fill flowing into the cup from within the container will be drawn off through the tube, and said electrode means comprising two electrodes disposed close to said cup and one at least terminating at the upper extremity of said cup.

LA VERNE EDWARD CLIFCORN.